Patented May 25, 1937

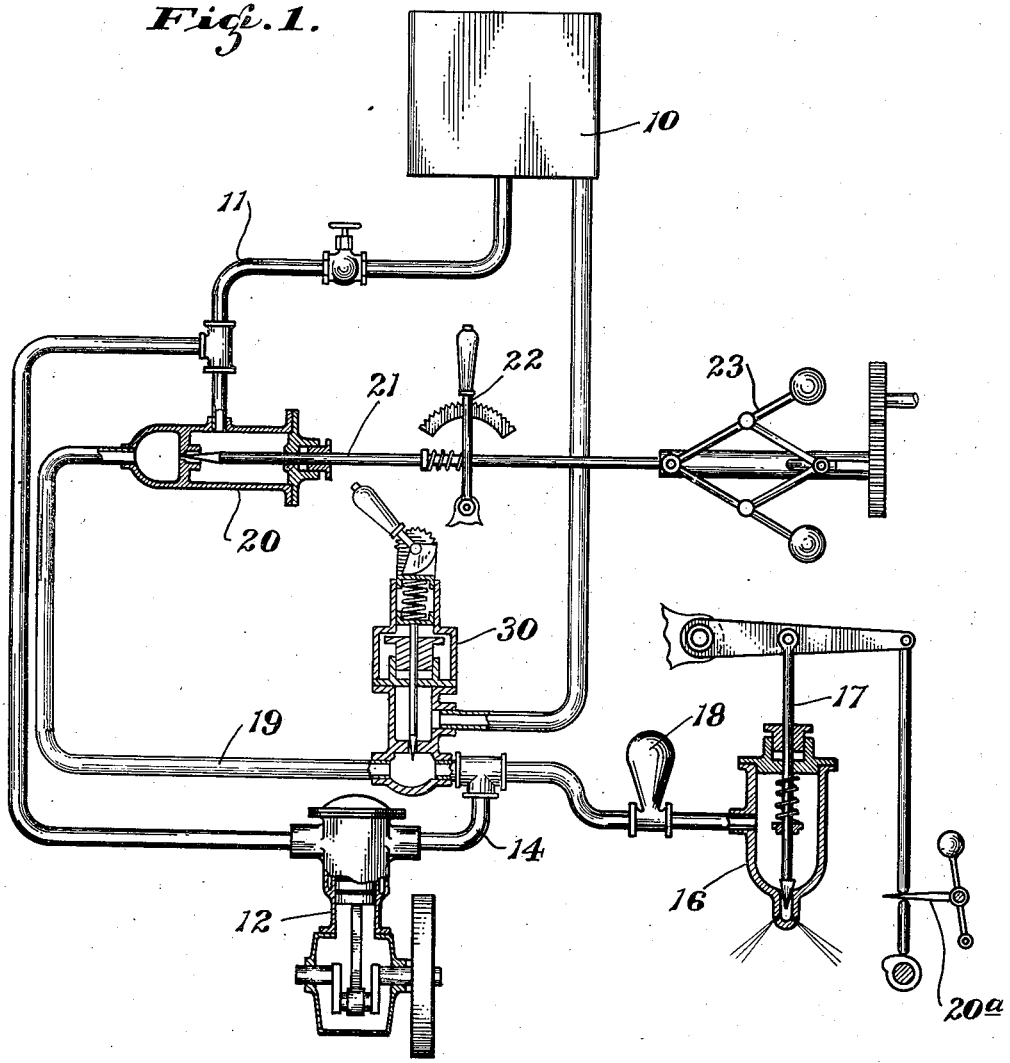

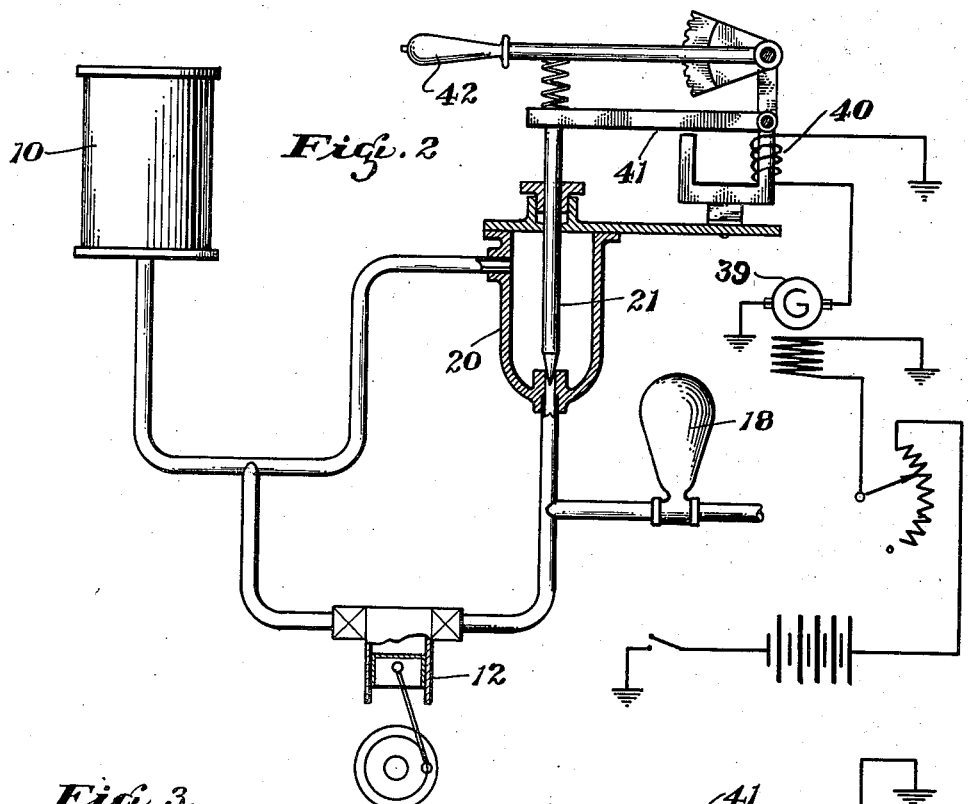
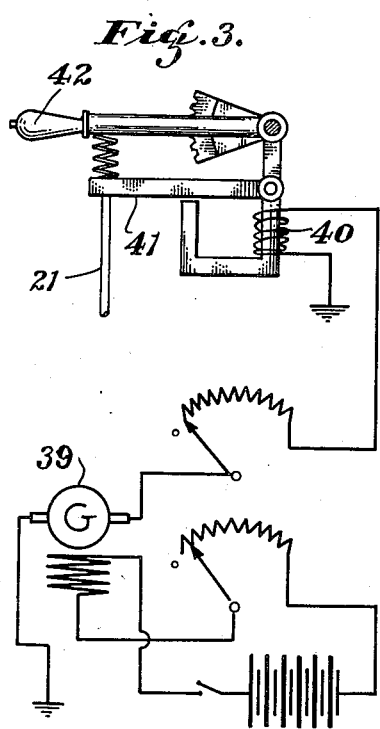
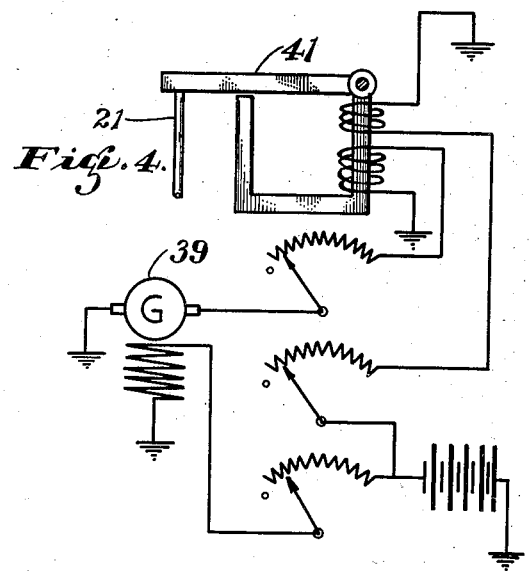

2,081,188

UNITED STATES PATENT OFFICE 2,081,188

FUEL INJECTION SYSTEM FOR INTERNAL COMBUSTION ENGINES

Brooks Walker, Piedmont, and Harry E. Kennedy, Berkeley, Calif.; said Kennedy assignor to said Walker Application July 24, 1929, Serial No. 380,581

7 Claims. (Cl. 123—140)

This invention relates to internal combustion engines and particularly pertains to a line pressure fuel injection system for engines operating on the full Diesel principle.

In an engine operating on the Diesel principle the volume of air delivered to the cylinder during each intake stroke is constant regardless of the speed or load of the engine. With this volume known the maximum amount of fuel which will combine with this amount of air in the cylinder to produce maximum torque and desired combustion can be determined. If this fuel charge is maintained constant and is injected throughout a predetermined speed range, the torque will be substantially constant subject to slight variations in volumetric efficiency throughout the speed range without fuel waste.

Hitherto, an attempt has been made to automatically maintain correct metering at all engine speeds in engines utilizing the line or rail pressure system by varying the pressure in the line in direct proportion to the engine speed. Such a method will not result in correct metering, due to the fact that varying the pressure in direct proportion to the engine speed results in varying the velocity of the fuel injection in proportion to the square root of the engine speed and not in direct ratio to the engine speed. We have determined that, in order to maintain correct metering, the velocity of the fuel at the nozzle must be in direct proportion to the engine speed and, therefore, the pressure in the line must vary in proportion to the square of the engine speed.

It is the principal object of the present invention to provide a line pressure fuel system for internal combustion engines by means of which correct metering of the fuel will be maintained at all engine speeds.

In carrying out this object into practice, we provide in conjunction with a line pressure system, apparatus of either mechanical or electrical type to vary the fuel pressure above the residual pressure in the line as the square of the engine speed. This automatic regulation of the pressure causes the fuel velocity at the nozzle to vary in direct proportion to the engine speed, which results in the injection of a constant charge, irrespective of the time of the valve opening and the engine speed. For example, should the initial speed of the engine be doubled, the open period of the engine valve will be reduced to fifty percent of the open period of the valve at the initial speed. As the line pressure above the residual pressure will increase in proportion to the square of the engine speed, the velocity of the fuel at the nozzle will be doubled and the same amount of fuel will be injected as at the initial speed.

The invention is exemplified in the following description and illustrated by way of example in the accompanying drawings, in which:

Fig. 1 is a schematic view disclosing the line pressure being controlled by mechanical apparatus.

Fig. 2 is a schematic view showing the line pressure controlled by an electrical apparatus.

Figs. 3 and 4 are diagrammatic views showing other electrical apparatus for use in connection with the present invention.

Referring to the accompanying drawings, and particularly to Fig. 1, our apparatus includes the usual reservoir 10, which is connected by a supply pipe line 11 to the intake port of a fuel pump 12. The discharge port of this pump 12 is connected by a delivery pipe line 14 to a fuel injection nozzle 16. This injection nozzle 16 is controlled by an injection valve 17. An air bulb 18 is interposed in the delivery line 14, as illustrated in the drawings.

The delivery line 14 is connected to the supply line 11 by a by-pass pipe line 19. A by-pass valve body 20 is interposed in the by-pass line. The passage of fuel through this by-pass body 20 is controlled by a by-pass valve 21. This by-pass valve 21 is a needle valve and is provided to control the pressure built up in the delivery line 14 and therefore control the amount of fuel discharged through the injector nozzle 16 during the open period of the injector valve 17.

The by-pass valve 21 opens against two pressure creating devices. One of these is a manually adjustable one and is indicated by the numeral 22. This device is to compensate for initial pressures. The device indicated by the numeral 23 is of the governor type. During the operation of the engine, the device 23 creates a pressure on the by-pass valve 21 which varies as the square of the engine speed. This varies the fuel pressure in the line 14 above the residual pressure as the square of the engine speed so as to maintain the velocity of the fuel discharged through the nozzle 16 in direct proportion to the engine speed. By such varying of the pressure in the delivery line 14 and varying the velocity of the fuel through the orifices in the nozzle in direct proportion to the engine speed, proper metering will be obtained, irrespective of the throttle setting effected by the wedge 20a. Thus, as the speed of the engine increases, or decreases, the fuel pressure above the residual pressure will vary as the square thereof, and the injected quantity will remain constant.

As before pointed out, the pressure in the line which we vary as the square of the engine speed is the pressure in the line in access of the residual pressure. Therefore, the pressure which we refer to herein and in the claims as the differential pressure and which is varied as the square of the engine speed must be interpreted as the differential between the residual pressure and the working pressure of the fuel.

We also desire to point out here that the coefficient of discharge of a nozzle varies with the characteristics of the nozzle. Also, the efficiency of an engine varies at different speeds so that the differential pressure in the line may not vary exactly as the square of the engine speed but will vary substantially as the square of the engine speed subject to varying conditions.

In connection with the by-pass line we have illustrated a throttle valve 30. The throttle valve 30 is in reality a by-pass valve between the by-pass line and the reservoir 10. The pressure required to open the valve 30 to regulate the pressure in the fuel delivery line 14 may be varied in order to limit the maximum amount of fuel injected.

Should the throttle valve 30 be set so that the engine will operate under full load at say 500 R. P. M. and should the engine speed increase, the pressure in the fuel line will remain at the maximum provided for by the setting of the throttle valve 30. Thus, the fuel velocity will also remain at the maximum and the amount of fuel delivered per injection will be reduced, due to the shorter open period of the injection valve. At speeds up to the maximum, however, the differential pressure in the fuel line 14 will vary as the square of the engine speed and the fuel velocity will vary in direct proportion to the engine speed so that correct metering will be maintained.

By adjusting the position of the wedge 20a, the amount of fuel admitted per injection may be controlled to produce a throttling effect. Thus, the throttle valve 30 and the wedge 20a may be used to throttle the engine. It is obvious, however, that the wedge 20a may be operated independently of the throttle valve 30 to limit the amount of fuel per injection and likewise the throttle valve 30 may be operated independently of the wedge 20a to limit the maximum pressure in the fuel line and reduce the amount of fuel per injection after the predetermined maximum speed of the engine has been attained.

In Figs. 2 to 4, inclusive, we have shown electrical apparatus for varying the pressure on the by-pass valve so that the differential pressure in the fuel delivery line will be maintained in direct proportion to the square of the engine speed and the velocity at the nozzle will be maintained in direct proportion to the engine speed. The electrical apparatus employed includes a separately excited generator 39, an electro-magnet 40 having an armature 41 operatively associated with the by-pass valve.

In the system shown in Fig. 2, the voltage will vary as the engine speed and the pressure of the armature on the by-pass valve will vary as the square of the engine speed. Thus, the differential fuel pressure in the line will vary in proportion to the square of the speed and the velocity of the fuel at the nozzle will vary in direct proportion to engine speed so that a proper metering will result. We illustrate a hand operated control lever 42 in Fig. 2 for the purpose of furnishing an adjustment for starting or regulating the pressure on the by-pass valve to equal the average pressure against which the fuel is injected.

The apparatus disclosed in Figs. 3 and 4 are similar to that just described in connection with Fig. 2, with the exception that by the electrical apparatus in Fig. 3, a variable resistance is introduced into the magnetic circuit which may be used for throttling. Also, an additional adjustment in the form of a resistance is placed in the circuit of the field excitation for the purpose of adjusting the range of the generated voltage.

In Fig. 4 we show an alternative method of obtaining an adjustable pressure on the by-pass valve by imposing a residual voltage on a separate magnetic coil from a suitable source of energy. Thus, we impose or create in Fig. 4 electrically a pressure on the by-pass valve to compensate for the starting or residual pressures. In Figs. 2 and 3 this is accomplished by means of the hand pressure lever arrangement 42.

From the foregoing, it is obvious that we have provided a method of maintaining a constant fuel charge in a motor equipped with a line pressure fuel system, regardless of the speed of the motor. In accordance with which method, the differential pressure in the fuel line is maintained as the square of the engine speed and, consequently, the fuel velocity at the nozzle will be in direct proportion to the engine speed. In addition to this, we are enabled to limit the maximum pressure in the fuel line for throttling purposes.

We also desire to point out that we can reduce the quantity of discharge by means of the wedge 20a in Fig. 1 so as to effect throttling. In the electrical apparatus we can vary the differential pressure in the line to maintain the product of velocity of discharge times the time of discharge constant regardless of engine speed and vary such constant to effect throttling.

While we have disclosed specific types of apparatus for practicing the invention, it is to be understood that our invention can be practiced by various types of apparatus within the scope of the appended claims.

Having thus described our invention, what we claim and desire to secure by Letters Patent is:

1. In combination with an internal combustion engine or the like, a fuel conduit conveying fuel under pressure to said engine, a relief valve in said conduit for controlling said pressure, said relief valve being positioned to bypass a portion of the fuel in said conduit and lead said portion elsewhere than to the combustion chamber of said engine, the pressure of the fuel within said conduit exerting a force tending to open said relief valve, centrifugally actuated elements rotatably connected to said engine and non-yieldably connected to said valve to directly resist the movement of said valve by a force which increases with an increase of engine speed.

2. In combination with an internal combustion engine or the like, a fuel conduit conveying fuel under pressure to said engine, a relief valve in said conduit for controlling said pressure, said relief valve being positioned to bypass a portion of the fuel in said conduit and lead said portion elsewhere than to the combustion chamber of said engine, the pressure of the fuel within said conduit exerting a force tending to open said relief valve, a centrifugally actuated element rotatably connected to said engine and nonyieldably connected to said valve to directly resist the movement of said valve by a force which increases with an increase of engine speed, and adjustable means applying an additional load tending to close said relief valve.

3. In combination with an internal combustion engine or the like, a fuel conduit conveying fuel under pressure to said engine, a relief valve in said conduit for controlling said pressure, said relief valve being positioned to by-pass a portion of the fuel in said conduit and lead said portion elsewhere than to the combustion chamber of the engine, the pressure of the fuel within said conduit exerting a force tending to open said relief valve, a generator driven by said engine whereby the output of said generator varies as the square of the speed of said engine, an electric device actuated by said electrical energy and operatively connected to said valve to exert a force thereon tending to close the same, whereby as the speed of the engine increases a progressively greater force will be exerted tending to close said valve, and adjustable yielding means exerting an additional force tending to close said valve.

4. In combination with an internal combustion engine having a fuel injection system, a relief valve for controlling pressure in said fuel injection system, a speed responsive device driven by said engine including rotating parts, and means for applying force generated by said rotary parts of said speed responsive device directly to said valve by mechanical means to increase the load thereon as the speed of the engine increases.

5. In combination with an internal combustion engine having a fuel injection system, a relief valve for controlling pressure in said fuel injection system, means for loading said valve to maintain a predetermined minimum pressure in said system, a speed responsive device driven by said engine and generating a force variable in accordance with the square of the speed of said engine, means for applying the force generated by said speed responsive device directly to said valve to increase the load thereon in accordance with increased engine speeds.

6. In a pressure fuel feed system for an internal combustion engine, means for creating pressure in the fuel feed system, a by-pass valve for controlling said pressure, adjustable means for applying a predetermined load on said valve, a speed responsive element driven by said engine and directly connected to said valve whereby the force developed in said element further and variably loads said valve against opening movement in accordance with the square of the speed of said engine.

7. In a pressure fuel feed system for an internal combustion engine, means for creating a pressure in the fuel feed system, a by-pass valve for controlling said pressure, a speed responsive element including rotating parts driven by said engine adapted to generate a force proportional to the square of the speed of rotation of said engine, means for applying the force generated by said speed responsive element by mechanical connections to said valve in a direction tending to close the same, the mechanical connections and the valve movement being so arranged that the radius of rotation of the rotating parts is maintained substantially constant throughout the range of movement.

BROOKS WALKER.
HARRY E. KENNEDY.